(No Model.) 2 Sheets—Sheet 1.
J. W. ALVERSON.
FERTILIZER DISTRIBUTER.
No. 273,002. Patented Feb. 27, 1883.
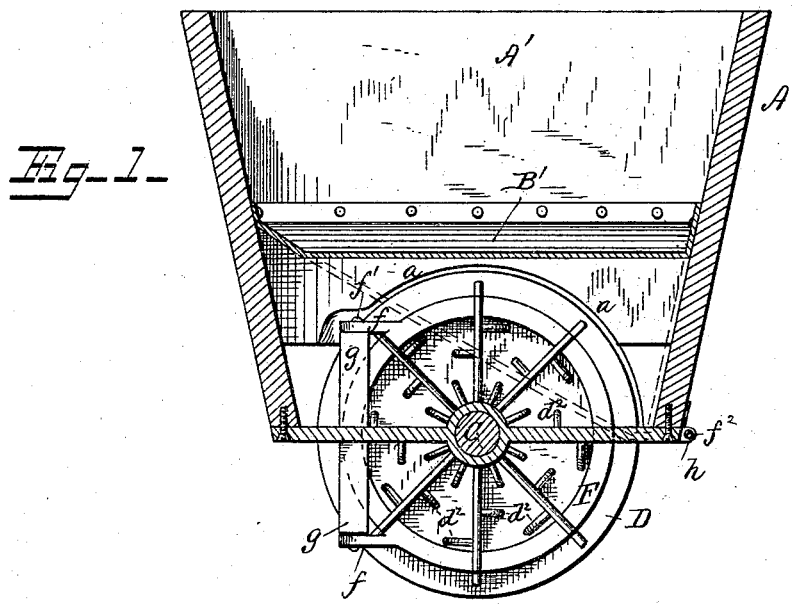
Fig. 1.
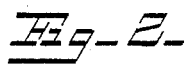
Fig. 2.
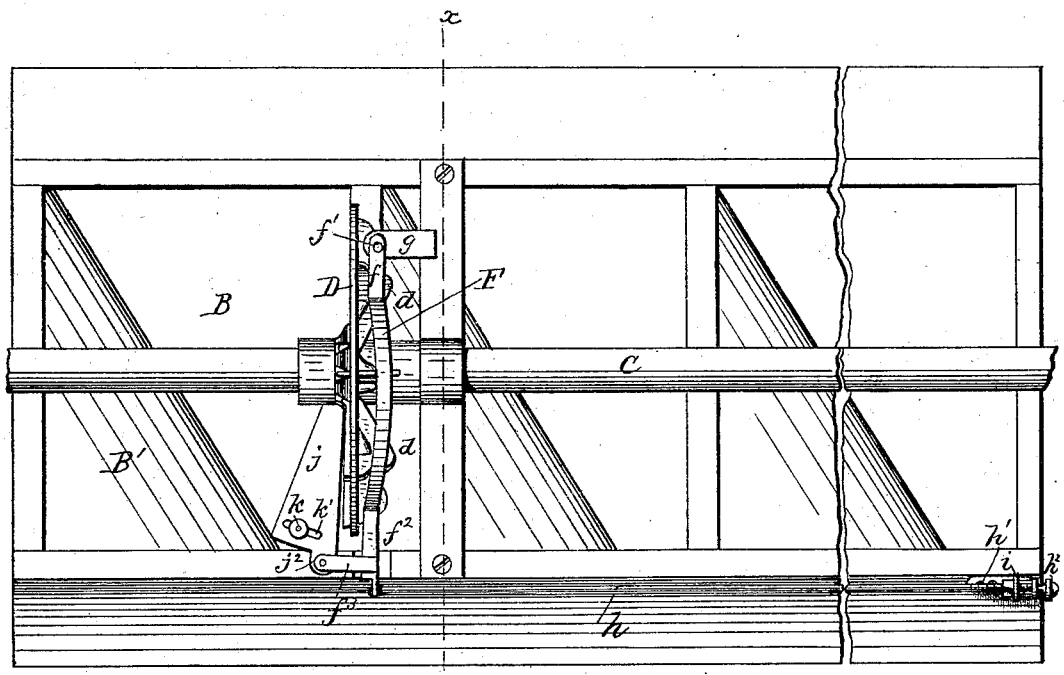
WITNESSES
F. L. Ourand
Rex Smith
INVENTOR
James W. Alverson
by A. L. Smith
Attorney
N. PETERS, Photo-Lithographer, Washington, D. C.

(No Model.) 2 Sheets—Sheet 2.
J. W. ALVERSON.
FERTILIZER DISTRIBUTER.
No. 273,002. Patented Feb. 27, 1883.
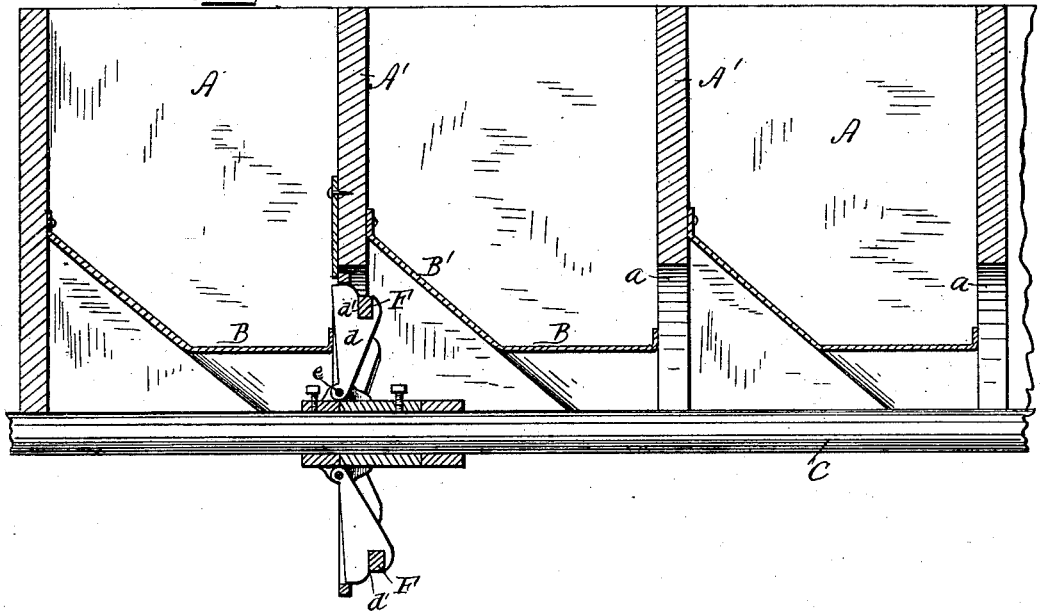
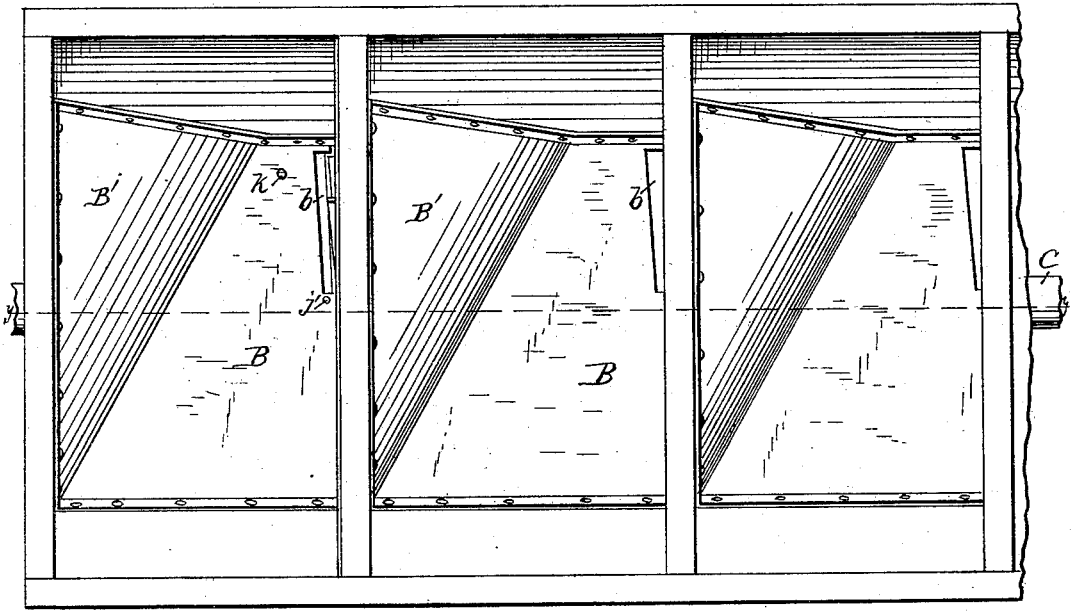
WITNESSES
F. L. Durand
Rex Smith
INVENTOR
James W. Alverson
by A. M. Smith
Attorney

UNITED STATES PATENT OFFICE.

JAMES W. ALVERSON, OF UNION SPRINGS, NEW YORK.

FERTILIZER-DISTRIBUTER.

SPECIFICATION forming part of Letters Patent No. 273,002, dated February 27, 1883.

Application filed November 20, 1882. (No model.)

*To all whom it may concern:*

Be it known that I, JAMES W. ALVERSON, of Union Springs, county of Cayuga, and State of New York, have invented a new and useful Improvement in Fertilizer - Distributers, of which the following is a full, clear, and exact description, reference being had to the accompanying drawings, making part of this specification.

My invention relates to a force-feed, having especial reference in its construction to the distribution of fertilizers, and intended for use as an attachment to grain-drills or seeding-machines; but it may be used for feeding and distributing other substances than that named, and disconnected from and independently of the ordinary seeding devices, if desired.

It is well understood by those familiar with the distribution of fertilizers that an even and regular flow of the same is attended with difficulty, owing to the sticky or adhesive nature of the materials or compounds ordinarily employed. This improvement is designed to overcome this difficulty; and it consists in the employment of a rotary disk, forming, either wholly or in part, one of the vertical sides of the hopper containing the material or fertilizer to be operated upon, said disk being provided with laterally-vibrating blades or buckets, which enter the hopper in their passage by the same, seize upon and carry out with them the desired amount of said material in regulated quantity, as hereinafter explained.

It further consists in the employment of an adjustable cam for controlling the path of the rotating blades or buckets, and in the arrangement of means for adjusting the cam and the path of the blades or buckets, and simultaneously therewith the size of the opening or outlet in the hopper through which the buckets and the material operated upon pass out of said hopper, as hereinafter explained.

In the accompanying drawings, Figure 1 represents a vertical section through a hopper having my improvements applied, taken on the line $x\ x$, Fig. 2. Fig. 2 is a bottom view of the hopper, showing my improvements applied to one of its compartments. Fig. 3 is a vertical section through a portion of the hopper, taken in the line $y\ y$, Fig. 4; and Fig. 4 is a plan view of the same.

The hopper shown is of a form designed for use upon a grain-drill as a fertilizer-distributer attachment thereto, being represented as divided into several compartments, which in practice would correspond with the number of seed-distributers or hoes or teeth employed, my improved fertilizer-distributer being shown, however, applied to one of the said compartments, that being sufficient to illustrate its application to any number or to each and all of such compartments, according to the number employed.

A represents the hopper, shown divided by partitions A' into several compartments, and provided each upon one side of said partition, which by preference is made vertical, for a reason which will be apparent, with sides and bottom converging toward said vertical side, and the outlet-opening $b$ in the bottom B, for the purpose which will be explained.

In suitable bearings connected with the hopper-bottom, or with the frame of the machine to which said hopper is applied, is mounted a shaft, C, extending transversely across the machine, underneath and parallel with the hopper-bottom, and provided with disks or wheels D, conforming in number to the number of compartments into which the hopper is divided, and arranged directly underneath the separating-partitions or end pieces, A'. The latter have each an arched opening formed or cut in its lower edge at $a$, and the shaft C is so arranged relatively thereto that the upper half or less of the disk will be projected up into and made to fill said opening, closing it against the escape of the fertilizing material and forming a rotary side or partial side to the compartment or hopper.

The disk D is provided with a series of radial slots, in which plates or buckets $d$ vibrate laterally. These plates are made, by preference, triangular in form, as shown in Fig. 3, and are pivoted at their inner ends, adjacent to the shaft C, in lugs or ears $e$, formed on the disk or hub, in such manner as to permit their outer ends to vibrate through the slots in the disk D. The outer expanded ends of these blades are bifurcated or notched at $d'$, adapting them to engage with a cam-ring, $f$, placed on the outer side of the disk D relatively to the hopper, and connected through arms or lugs $g$, attached to the frame or hopper-bottom. The pivot $f'$, as will be seen by reference to Figs. 1 and 2 of the drawings, is arranged at one side or edge of the cam-ring, adapting the latter at its opposite side to be vibrated or adjusted toward or away from the disk D, for causing the plates or buckets to be projected more or less through the slots therein as they are acted upon by said adjustable portion or side of the cam. The cam-ring is made in wave form, adapting it to act upon the plates $d$ during their passage by the opening in the side of the hopper covered by the disk D, for forcing them laterally through the disk into the hopper and causing them to act upon and carry out with them through the opening $b$ any desired amount of the contents, and then to retract them far enough to bring their inner edges flush with the inner face of the disk, which position they occupy when they enter the opening for the wheel or disk D in the side wall of the hopper, being projected laterally into the hopper as they pass by the opening covered by the disk in the side thereof. The side or edge of the cam-ring opposite the pivot $f'$ is provided with an arm, $f^2$, which projects beyond the periphery of the disk D, and is connected with an adjusting-rod, $h$, which is shown provided near its outer end with a screw-thread at $h'$, which works in a perforated lug or ear, $i$, attached to the hopper or machine-frame. This lug or ear is provided with an internal screw-thread, and forms a stationary nut in which the rod $h$ is adjusted longitudinally by means of a thumb-piece, $h^2$, or lever at its outer end for adjusting the cam-ring as desired.

The outlet-opening $b$ in the hopper-bottom is made to conform in shape to the shape of the blades or buckets $d$, and is covered, to a greater or less extent, as may be required, to permit the passage of the blades or buckets, by a plate, $j$, also made, by preference, triangular in form, and pivoted at its point or smaller end to the hopper-bottom at $j'$. This plate $j$ has a transverse slot, $k'$, formed in its expanded end, curved in the arc of a circle of which the pivot $j'$ is the center, and a headed pin, $k$, passing through said slot and secured to the hopper-bottom, serves to uphold and steady the swinging or adjustable end of said plate, while at the same time permitting its adjustment. A projecting lug or ear, $j^2$, on said swinging end is connected by an arm or link, $f^3$, with the arm $f^2$ of the cam-ring in such manner that any movement of said ring for adjusting the movement or throw of the buckets $d$ into the hopper is imparted to the pivoted plate $j$ for regulating or adjusting the size of the discharge-opening to conform thereto.

Similar disks with buckets having controlling-cams and means for adjusting the same, and the discharge-openings, being applied to each of the compartments of the hopper, and all the cams being connected with the adjusting-rod $h$, all may be simultaneously adjusted for regulating at will the amount of fertilizer to be discharged.

The disk D is shown provided on its outer face with spurs or lugs $d^2$, arranged on opposite sides of the slots in which the blades or buckets $d$ work, said lugs serving as steadying-pins to guide and steady the blades or buckets in their vibratory movements, and to uphold them against the pressure of the material operated upon. By reference to Figs. 3 and 4 it will be seen that the opening in the partition for the disk D is covered on the outer side opposite the operative face of the disk by the flaring bottom of the hopper, as indicated at B'; but the wheel may be covered and protected on said side in any other suitable manner—as, for example, by making the partition thicker or double, with the side opposite the disk diverging downward. By making the sides and bottom of the hopper to converge toward the feed wheels or disks D and the discharge-outlets $b$ the contents of the hopper will tend to move toward said wheel and outlet, and, assisted by the jolting of the machine, will be constantly forced into position to be seized upon and carried out by the blades or buckets $d$ as long as anything remains in the hopper to be acted upon. From the point of discharge of the fertilizing material the latter may be conducted to the ground by any of the usual appliances for that purpose, according to the kind of machine on which the distributer is employed, whether it be upon a grain-drill, a broadcast-seeder, or a planter. The withdrawal or retracting of the blades by the cam after they pass the outlet $b$ serves to clear them of any adhering material, the side walls of the slots in which they move acting as scrapers. It will be apparent that the form of the vibrating buckets, and also of the cam for imparting a lateral movement thereto relatively to the disk or wheel, may be varied, the latter for giving a more or less abrupt lateral movement to the buckets in forcing them into the hopper, and in retracting them after they have passed out of said hopper; also, that the form of the adjustable slide over the outlet-opening and the means for adjusting the cam and slide may be changed without departing from my invention.

The shaft C, for operating the distributing disk or disks, may be connected with and operated from the carrying wheel or wheels of the machine in any suitable manner.

Having now described my invention, I claim as new—

1. In a machine for distributing fertilizers or other material, the combination, with the hopper for containing said material, of a vertical disk or wheel provided with laterally-moving blades or buckets which enter the hopper in their passage by it.

2. The combination, with the hopper, of the slotted rotating disk, blades or buckets vibrating in slots in and laterally relatively to said disk, and a cam for vibrating said blades, substantially as described.

3. The combination, with the hopper, of a rotating disk provided with radial slots, blades, or buckets adapted to be vibrated laterally in said slots, and an adjustable cam for controlling the path of said blades or buckets, substantially as described.

4. The hopper provided with an outlet-opening, and an adjustable slide for regulating the size of said opening, in combination with a rotating disk provided with laterally-vibrating buckets which enter the hopper in their passage by it, and an adjustable cam for regulating the throw of said buckets into the hopper, connected with the adjustable slide over the outlet-opening for simultaneously adjusting the path of the buckets and the size of the outlet opening to conform thereto.

5. The combination of the hopper provided with converging sides and bottom, the adjustable discharge-outlet slide, the rotating slotted disk D, vibrating buckets $d$, moving laterally relatively to the disk, adjustable cam F, and means for adjusting said cam and outlet-slide, substantially as described.

In testimony whereof I have hereunto set my hand this 6th day of November, A. D. 1882.

JAMES W. ALVERSON.

Witnesses:
BARNY M. STEBBINS,
GEORGE H. THOMPSON.